June 22, 1965      C. P. O'BRIEN      3,190,003

RETICLE FOR OPTICAL INSTRUMENT

Filed March 22, 1962

United States Patent Office 3,190,003
Patented June 22, 1965

3,190,003
RETICLE FOR OPTICAL INSTRUMENT
Clifford P. O'Brien, San Jose, Calif., assignor to Swift Instruments, Inc., Boston, Mass., a corporation of Massachusetts
Filed Mar. 22, 1962, Ser. No. 181,698
3 Claims. (Cl. 33—50)

The present invention relates to a range finding reticle for optical instruments and more particularly to a reticle for a telescopic gun sight by use of which the user can estimate the range to a target.

Reticles of various kinds for use in estimating range are known, such as reticle glasses which contain grids or cross hairs wherein the spacing between lines serves to indicate range. While generally satisfactory for their intended purpose, none of such prior known reticles is entirely satisfactory for use in a telescopic gun sight to enable the user to estimate the range at a glance, without careful observation or computation of any kind.

An object of the present invention is to provide a reticle for an optical instrument by means of which the observer may estimate the range at a glance.

A further object of the invention is to provide such a range finding reticle in which the range-indicating indicia are of a simple and clear form.

A further object of the invention is to provide such a reticle wherein the range-finding indicia are of a simple geometric shape, adapted to rapid use by the observer, for example on a moving target.

Other objects, features and advantages of the invention will become apparent from the following description of a presently preferred embodiment of the invention, in which description reference is made to the accompanying drawings, wherein.

Figure 1:
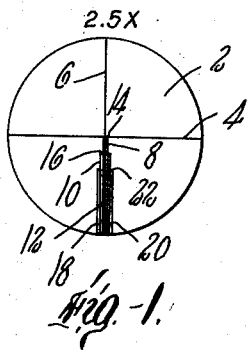
FIG. 1 is an elevation of a reticle disk in accordance with the invention as seen at low power.
Figure 2:
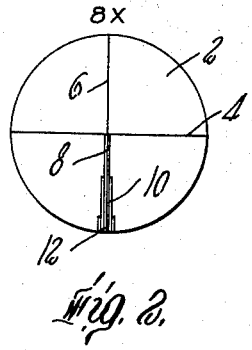
FIG. 2 is an elevation of the reticle disk of FIG. 1 as seen at higher power.

In accordance with the invention, I provide a range-finding reticle for an optical instrument comprising a transparent reticle disk and indicia carried by the disk, said indicia including a clearly visible area or areas, as distinguished from a line such as is employed in many prior reticle disks for one purpose or another. At least one dimension of the area, such as its height or width, denotes the range to a target of which the observer knows the size of a dimension, such as height or width, when the image of the target dimension, observed through the reticle, is the same in size as the dimension of the area on the reticle. Preferably a plurality of such areas are provided on the reticle, abutting each other, and of a series of graduated sizes so that the range to targets of different known or estimated sizes can be more readily estimated.

Referring to the drawing, the reticle glass of the invention comprises a transparent reticle disk 2 which may be of conventional light transmitting material, preferably glass, circular in shape and adapted to be disposed within the optical system of an optical instrument, which will usually be a telescopic optical system, in the manner well understood in the art. Normally the reticle disk will be disposed at the focal plane of the optical system. The reticle glass 2 carries on one of its faces visible markings or indicia, applied in a conventional manner, including a horizontal cross line 4 and a vertical cross line 6 extending upwardly from the horizontal cross line 4 and intersecting the horizontal cross line at the optical center of the system.

The range-finding indicia are disposed in the lower half of the reticle and comprise a first rectangular area 8, a second rectangular area 10, and a third area 12. All of the areas are of uniform density within an area. They may be semi-transparent, or opaque. The first rectangular area has its upper edge 14 coincident with the horizontal cross line 4 and extends downwardly from the cross line 4 for a distance greater than the width of the area. The second rectangular area 10 has its upper edge 16 coincident with the lower edge of the first area 8. The second rectangular area 10 is of greater width than the first area 8; preferably it is twice as wide. Preferably it is of the same height as the area 8.

The third area 12 also is rectangular in shape except that its lower margin is curved where it is coincident with the lower margin of the reticle glass 2, that is, the third area 12 has straight vertical sides 18 and 20 and a straight horizontal upper edge 22. The upper edge 22 of the third area 12 coincides with the lower edge of the second area 10. The third area 12 is of greater width than the second area 10 and preferably is twice the width of the second area 10.

Figure 3:
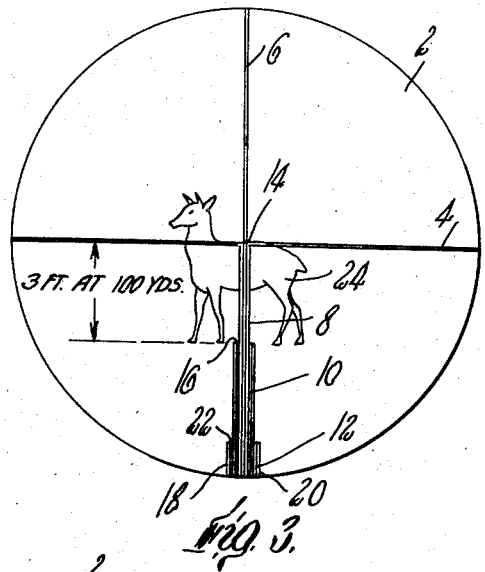
FIG. 3 is similar to FIG. 1 but showing the reticle indicia to a larger scale and indicating one manner of use.
Figure 4:
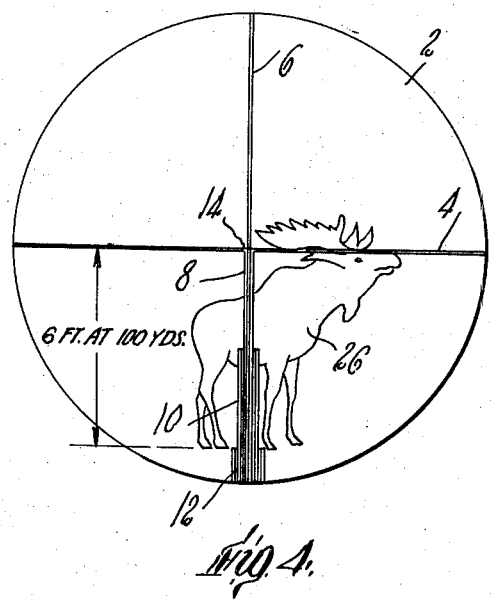
FIG. 4 is similar to FIG. 3 but illustrates another particular use of the reticle.

As is illustrated in FIG. 3, the height of the first area 8 is such that when it is the same as the height of the observed image 24 of an object or target which the observer knows or estimates is 3 feet high, the range from the observer to the target is 100 yards. The areas 8 and 10 together are of twice the height of each area alone, since they are individually of the same height. This is a convenience in estimating the ranges to targets of greater height than either one of the areas alone. For example, as shown in FIG. 4, if the target is known or estimated to be about 6 feet in height, the observer by placing the cross line 4 at the top of the target image and comparing the bottom of the target image with the height of the areas can conveniently estimate the range. For example, if the bottom of the target image coincides with the lower edge of the second area 10, as in FIG. 4, the observer knows that the range to the target is 100 yards.

When the target image observed through the reticle is of a different size from the height of any of the areas, the observer still can estimate the range by estimating the proportion of the height of an area or areas which corresponds to the height of the target image. Thus if the target image is about one-half the height of the first area 8 and the height of the target is known or estimated to be about 3 ft., the observer knows that the range is about 200 yards. Similarly, if a target of known height of 1½ feet produces an image of the same height as area 8 (or 10), the observer knows that the range is about 50 yards. In this way all ranges can be estimated, for targets of all sizes.

Figure 5:
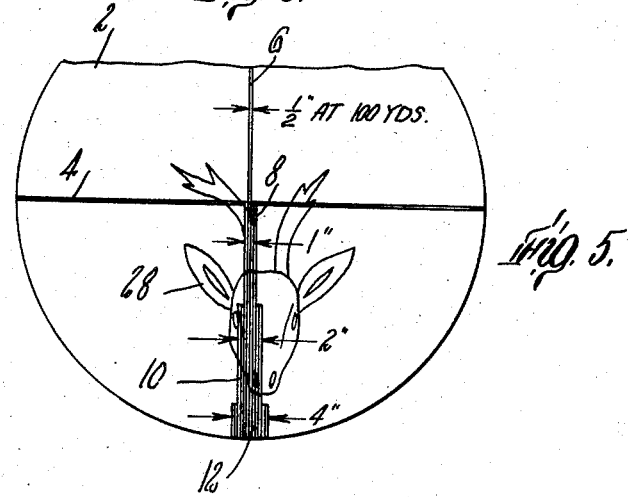
FIG. 5 is similar to FIGS. 3 and 4 but illustrating a third practical application of the reticle.

In the same way, the widths of the areas are related to the ranges to targets of certain sizes so that the widths of these areas can be used to estimate range. As shown in FIG. 5, the width of the area 8 is such that it subtends 1 inch of target at 100 yards, the width of the second area 10 is twice as great as the width of area 8 and therefore the area 10 subtends 2 inches of target at 100 yards. The area 12, twice as wide as the area 10, subtends 4″ of target at 100 yards. Thus by comparing the width of some one of the areas 8, 10 and 12 with the width of the image of some portion or dimension of the target of estimated or known size, the observer can estimate the range to the target. In FIG. 5, the image of the base of the antler of the deer 28, which the hunter knows is approximately 1 inch in diameter or width, is of a width approximately the same as the width of the first area 8. Accordingly the hunter can at once estimate that the range to the deer is about 100 yards. The width of the other areas 10 and 12 all differ from each other and from the width of the area 8 as described above, thereby affording convenient indicia for comparison with horizontal dimensions of various targets at various ranges whereby they can conveniently be used by the observer to estimate the range, in the manner described above.

By making the heights of areas 8 and 10 the same, these areas serve in effect as a scale, for convenient comparison with target images. Similarly, since each of the areas 8, 10 and 12 is twice as wide as the area next above it, these areas serve together to provide a convenient scale for estimation of range.

Preferably, the vertical cross line 6 is made one-half as wide as the area 8, so that this line also can be used to estimate range.

In the specification and claims the reference to "known" sizes of dimensions of a target, such as known heights or known widths of a target, are intended to include also sizes such as widths or heights which can be estimated by the observer. As the word target is used herein it is intended to include any object which is sighted through the reticle, whether it is one to be fired upon or not.

It will be appreciated that the invention is not confined to the exact form of indicia areas shown and described. Thus wider areas may be disposed above rather than below narrower areas, or the entire group of indicia areas may be disposed in the upper half of the reticle disk, or at other locations on the disk. While the proportions between the different areas described in detail are presently preferred, the invention is not confined to those particular preferred proportions. Thus an area which is wider than another of the indicia areas may be wider by some other factor than 2.

Although the reticle of the invention has been described in detail for purposes of illustration and disclosure of the invention as applied to a gun sight, it will be understood that the reticle of the invention is equally applicable to other telescopic optical instruments such as range finders, binoculars, telescopes, and the like.

I claim:

1. A range-finding reticle for a telescopic optical instrument comprising a transparent reticle disk and visible indicia carried by the disk, said indicia comprising
a horizontal cross line,
a first rectangular area having a greater height than width and having its upper edge coincident with said horizontal line,
a second rectangular area having one edge coincident with the lower edge of said first area, having a greater height than width, and being wider than said first area,
and a third area having at least three straight edges one of which is coincident with the lower edge of said second area, and being wider than said second area, the width of each of said areas and the height of said first and second areas each independently denoting the range to a target having a certain known corresponding dimension when the observed image of said target dimension is the same size as said area dimension, whereby the observer can selectively estimate the range to a target by visually comparing a dimension of its image with one of said dimensions of a said area.

2. A range-finding reticle for a telescopic optical instrument comprising a transparent reticle disk and visible indicia carried by the disk, said indicia comprising,
a vertical cross line extending upwardly from the center of the disk,
a first rectangular area centered on said vertical line, having a greater height than width and having its upper edge coincident with the center of said disk,
a second rectangular area centered on said vertical line, having a greater height than width, having its upper edge coincident with the lower edge of said first area, being wider than said first area and of the same height as said first area, and
a third area centered on said vertical line and having straight vertical side edges, and a straight horizontal upper edge coincident with the lower edge of said second area, having a greater height than width, and being wider than said second area,
the width of each of said areas and of said vertical cross line and the height of said first and second areas each independently denoting the range to a target having a certain known corresponding dimension when the observed image of said target dimension is the same size as said area dimension, whereby the observer can estimate the range to a target by visually comparing the size of its image with the size of a dimension of a said area.

3. A range-finding reticle for a telescopic optical instrument comprising a transparent reticle disk and visible indicia carried by the disk, said indicia comprising
a horizontal cross line,
a vertical cross line extending upwardly from and intersecting said horizontal cross line at the optical axis,
a first rectangular area centered on said vertical line, having a greater height than width and having its upper edge coincident with said horizontal line,
a second rectangular area centered on said vertical line, having a greater height than width, having its upper edge coincident with the lower edge of said first area, being twice as wide as said first area and of the same height as said first area, and
a third area centered on said vertical line and having straight vertical side edges, a straight horizontal upper edge coincident with the lower edge of said second area and a lower edge coincident with the margin of the reticle, having a greater height than width and being twice as wide as said second area,
the width of each of said areas and of said vertical cross line and the height of said first and second areas each independently denoting the range to a target having a certain known corresponding dimension when the observed image of said target dimension is the same size as said area dimension, whereby the observer can estimate the range to a target by visually comparing the size of its image with the size of a dimension of a said area.

References Cited by the Examiner
UNITED STATES PATENTS

| 8,968 | 6/15 | Ratcliffe | 33—64 |
| 1,190,121 | 7/16 | Critchett | 33—50.5 |

FOREIGN PATENTS

| 3,729 | 8/81 | Great Britain. |
| 8,896 | 6/15 | Great Britain. |

ISAAC LISANN, *Primary Examiner.*